Patented June 19, 1951

2,557,256

UNITED STATES PATENT OFFICE 2,557,256

LINEAR POLYMERIC HYDROXY KETO ESTERS AND PROCESS FOR PREPARING SAME

Merlin M. Brubaker, Chadds Ford, Pa., assignor to E. I. du Pont de Nemours & Company, Wilmington, Del., a corporation of Delaware No Drawing. Application June 4, 1949, Serial No. 97,319

12 Claims. (Cl. 260—63)

This invention relates to new polymers and to methods for their preparation. The present application is a continuation-in-part of my copending application, S. N. 552,374, now abandoned, filed September 1, 1944, which in turn is a continuation-in-part of my earlier application S. N. 449,765, filed July 4, 1942 (now abandoned). In these copending applications I have disclosed the interpolymerization of carbon monoxide with unsaturated substances, such as aliphatic monoolefines, fluorinated ethylenes, vinyl and vinylidene compounds, and I have disclosed also that olefinic compounds can be interpolymerized with carbon monoxide in the presence of a liquid reaction medium, such as an alcohol.

It is an object of this invention to provide polymers from a mixture of monomers of which carbon monoxide is an essential component. It is a more specific object to provide new polymers from carbon monoxide, polymerizable organic compounds containing ethylenic unsaturation, and other reactants, such as an alcohol or alkyl formate. Another object is to provide carbon monoxide polymers containing ester groups within the polymer molecule. A further object is to prepare high molecular weight products from ethylene, carbon monoxide, and alcohols. Other objects will appear hereinafter.

According to this invention, a process is provided for polymerizing carbon monoxide with a polymerizable organic compound containing ethylenic unsaturation and an alcohol or an alkyl formate, in the presence of a catalyst of the kind which is effective for converting ethylene to solid homopolymers. In one embodiment, carbon monoxide is polymerized with the polymerizable organic compound containing ethylenic unsaturation, in the presence of a peroxy catalyst (or other free radical-generating catalyst), and in the absence of a Friedel-Crafts catalyst, in the presence of an alcohol or an alkyl formate, to yield a novel type of polymeric product. In the preferred mode of operation, the polymerizable organic compound, carbon monoxide, and alcohol or alkyl formate are heated together under pressure in the presence of an organic peroxide catalyst, and in the absence of a Friedel-Crafts catalyst. The polymerization can be carried out either as a batch, semi-continuous, or continuous operation. It is generally conducted in vessels which are either constructed of or lined with glass, stainless steel, silver, etc.

In general, the polymeric product obtained in accordance with this invention has a more or less linear structure. In most instances it has a softening point above room temperature, although liquid products of molecular weight exceeding about 500 may also be obtained. The process of the present invention, in a particular embodiment, produces a polymer, containing ester groups. Generally, these polymers have the recurring unit,

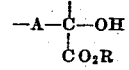

wherein A is the residue from the polymerizable organic compound and R is the non-hydroxyl portion of the alcohol or the alkyl residue of the alkyl formate. Since these products also contain keto groups they are polymeric hydroxy keto esters. When the polymerizable organic compound is ethylene, A in the above formula is —CH$_2$—CH$_2$—. For example, the polymer from ethylene, carbon monoxide and an alcohol of the general formula ROH (or alkyl formate) contains the recurring structural unit

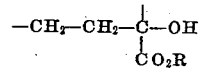

wherein R is the non-hydroxyl portion in the said alcohol of the formula ROH or the alkyl portion of the alkyl formate. Moreover, these products also contain keto groups, e. g.,

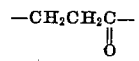

groups.

By "polymerizable organic compound containing ethylenic unsaturation" is meant compounds which contain the group >C=C< and which, in accordance with the present state of the art, are recognized as being capable of undergoing a polymerization reaction involving addition across the ethylenic double bond, which reaction is catalyzed by peroxy compounds. A class of these compounds which may be employed, and which, as the art has now developed, is cognizable under the term "peroxide-polymerizable" embraces ethylene, propylene, the butylenes, pentylenes, hexylenes, cyclohexene, butadiene, 2,3-dimethylbutadiene, 2-methyl butadiene, vinylcoclohexene, and the like; vinylidene chloride; organic vinyl esters such as vinyl propionate, vinyl benzoate, vinyl acetate, vinyl isobutyrate, vinyl laurate, etc.; vinyl ketones such as methyl vinyl ketone and methyl isopropenyl ketone; acrylo- and methacrylonitriles; diallyl compounds such as diallyl phthalate; butenedioic acids and their derivatives, such as maleic and fumaric acids, their esters, nitriles and anhydrides, and the like. Combinations of ethylene with one or more additional polymerizable organic compounds such as styrene are particularly useful for polymerization with carbon monoxide in the practice of this invention. Monoolefin hydrocarbons of 2 to 6 carbon atoms and which contain a terminal methylene group are preferred since the most satisfactory results with respect to yield and polymer quality are obtained when such compounds are used.

In the preparation of the polymeric hydroxy keto esters of this invention any alcohol may be used. Thus, the alcohol may be monohydric or polyhydric and may be primary, secondary or tertiary. It may also be aliphatic, aromatic or cycloaliphatic. Examples of suitable alcohols are methanol, ethanol, propanol, octanol, tertiary butyl alcohol, isopropanol, dodecanol, octadecanol, ethylene glycol, and butylene glycol; allyl alcohol, oleyl alcohol; benzyl alcohol, methylbenzyl alcohol, cyclohexanol, propylcyclohexanol, furyl alcohol, tetrahydrofuryl alcohol, aminoethanol, 3-methoxypropanol-1, and the like. In place of these alcohols there may be used alkyl formates such as methyl formate, ethyl formate, octyl formate, dodecyl formate, octadecyl formate, and the like. The preferred alkyl formates are the lower alkyl formates and especially methyl and ethyl formates because of their availability and low cost.

As catalysts for use in this invention, any of the catalysts, other than Friedel-Crafts catalysts, which are effective for polymerizing ethylene, may be used. These catalysts have been disclosed in U. S. Patent 2,395,292 and U. S. 2,433,015. The most effective catalysts are the organic azo compounds, and peroxy compounds. Within the scope of the term "peroxy compound" is meant to be included any compound which is capable of inducing vinyl polymerization and which contains the bivalent group, —O—O—. Examples of such compounds are oxygen, benzoyl peroxide, lauroyl peroxide, succinoyl peroxide, diphthalic acid peroxide, dioxane peroxide, diethyl dioxide, tert.-butyl pentamethyl propyl peroxide, di-tert.-butyl peroxide, tert.-butyl hydroperoxide, ethyl hydroperoxide, peracetic acid, perbonzoic acid, potassium peroxydisulfate, ammonium peroxydisulfate, sodium and potassium percarbonates, and the like. Other operable catalysts are azines such as diphenylketazine and benzalazine, and organo lead compounds such as diethyl lead dibromide. In general, compounds which readily form free radicals under the polymerization conditions may be employed as catalysts. These include azo compounds in which both valences of the azo group, —N=N—, are satisfied by different aliphatic carbon atoms, and particularly those azo compounds wherein both valences of the azo group are attached to different aliphatic carbon atoms, at least one of which is and preferably both are tertiary carbon atoms having further attached, through another carbon atom, a negative radical which is neutral with respect to acidity, in which radical the three remaining valences of the latter carbon atom are satisfied by oxygen and/or nitrogen, i. e., nitrile, carbalkoxy, carbamyl, and the azo nitrogens are acyclic. Examples of such compounds are alpha,alpha'-azobis(alpha,gamma-dimethylvaleronitrile), dimethyl and diethyl alpha,alpha'-azodiisobutyrate, 1,1'-azodicyclohexanecarbonitrile, alpha,alpha-azobis(alpha-methylbutyronitrile), alpha,alpha'-azobis(alpha-ethylbutyronitrile), alpha,alpha'-azo-didisobutyrocarbonamide, and alpha(carbamylazo)isobutyronitrile. Other specific catalysts which are effective include hydrazine hydrochloride, dibenzoyl hydrazine, acetoxine, camphoroxine, trimethylamine oxide, etc. Perhalocompounds, e. g., hexachloroethane, octachloropropane, also are useful catalysts for preparing the polyesters of this invention.

Combinations of two or more of the above catalysts may be used, if desired.

The concentration of catalyst employed may be varied over a wide range. For reasons of economy, it is desirable to employ as small an amount of catalyst as possible, for example, 0.01% by weight of the combined polymerizable monomers present in the charge. If desired, larger amounts in the range of from 1% to 15% may be used.

The products of this invention are obtained employing pressures in the range of from slightly above atmospheric up to 20,000 atmospheres and above. Generally, however, pressures of from 500 to 12,000 atmospheres are used.

The mole ratio of carbon monoxide to olefin in the gas charge may be varied between 99:1 to 1:99 and the mole ratio of total gas to alcohol or alkyl formate may be varied between 10:1 and 1:10.

By properly correlating such interdependent variables as pressure and composition of the gas mixture charged into the reactor, it is possible to obtain orientable polyesters. Thus, ethylene/carbon monoxide mixtures containing 30% carbon monoxide and pressures of 2500 atmospheres lead to the obtainment of orientable polyesters. If the carbon monoxide content of the gas mixture charge is increased to 40%, however, the pressure must be increased to around 3000 atmospheres in order to obtain orientable products. Orientable products are obtained, however, at lower pressures provided the gas charge contains no more than 10% carbon monoxide. If the gas charge contains more than 40% carbon monoxide, then pressures above 3000 atmospheres must used to obtain orientable products.

Although use of an added reaction medium is not always essential or desirable, a liquid (in addition to the alcohol reactant) may be added to serve as a reaction medium, to obtain certain beneficial results.

For best results reactants and any added liquid reaction media are carefully purified before use.

Although oxygen is an operable catalyst in this invention, it usually has a deleterious effect in polymerizations involving use of another peroxy compound as catalyst. Therefore, oxygen is preferably excluded from the reaction vessel during polymerization. The process of this invention is operable when the gaseous reactants contain 200 or more parts of oxygen per million parts of reactant, but it is desirable and not unduly troublesome and expensive to hold the oxygen concentration below 20 parts per million. Water may be conveniently removed from the reactants by passing them through a bed of activated alumina.

Carbon monoxide for use in the process of this invention may be obtained from any source, for example, by the action of steam or carbon dioxide on hot coal, by the reaction of methane with steam, or by the decomposition of formic acid or methyl formate. It is preferably free of metal carbonyls such as iron carbonyl, nickel carbonyl and cobalt carbonyl or substances which may generate such carbonyls. If such substances are present the reaction takes a different course, as disclosed in copending application S. N. 75,968, filed February 11, 1949, yielding, in general, unpolymerized esters. In order to insure uniformity of polymer composition, carbon monoxide introduced into the reaction is preferably introduced simultaneously with the other polymer ingredients in a definite predetermined ratio.

The process of this invention may be carried out at temperatures varying from 25° C. to as high as 350° C. or higher. The optimum temperature in each case depends upon the nature of the materials to be polymerized, the reaction medium, the type and amount of catalyst, the pressure, and the type of product desired. If products of maximum molecular weight are desired, it is usually preferable to operate at the lowest temperatures which are consistent with a reasonable reaction rate. Use of higher temperatures usually leads to lower molecular weight products which are lower-softening and more soluble. Use of secondary alcohols, e. g., isopropyl alcohol, relatively large amounts of catalyst, and relatively low pressures leads to the formation of distillable hydroxyketones. In most cases the preferred temperature is between 50° and 250° C. Optimum temperatures can readily be determined for each polymerization system by carrying out a few preliminary experiments.

The following examples illustrate the practice of this invention and demonstrate operable conditions. Parts given are by weight unless otherwise specified.

*Example 1.*—A pressure reaction vessel is charged with 0.25 part of a 62.5% solution of tertiary-butyl hydroperoxide in tertiary-butyl alcohol, closed, and pressured to 450 atmospheres with a mixture of carbon monoxide and ethylene, which mixture contains 20% carbon monoxide by weight. The temperature of the agitated reaction mixture is raised to 130° C. and kept at 129° to 132° C. for a period of 15 hours, during which time the pressure is maintained at 850 to 1000 atmospheres. The vessel is cooled, the excess gases are bled off, and the vessel is opened. There is obtained 42 parts of fused tough polymer. This polymer contains ester groups and ketone groups.

*Example 2.*—A silver-lined pressure reactor is charged with 78.6 parts of tertiary butyl alcohol and 3.4 parts of a 60% solution of tertiary butyl hydroperoxide in tertiary butyl alcohol. The reactor is cooled and evacuated and then pressured to 1000 atmospheres at 130° C. with a gas mixture composed of 30% ethylene and 70% carbon monoxide. The reactor is shaken and maintained at the indicated temperature and at a pressure of 845 to 1000 atmospheres for 19 hours, during which time the pressure is held at the indicated level by periodically repressuring with the ethylene/carbon monoxide gas mixture. Thereafter the reactor is allowed to cool, opened, and the contents discharged. From the reaction mixture there are recovered 23 parts of a brown powder analyzing 63.59% carbon and 7.50% hydrogen. From this analysis it may be calculated that the amount of tertiary-butyl alcohol combined in the polymer was 9%. Infrared analysis showed an absorption band in the spectrum at 2.9 microns, indicating the presence of hydroxyl groups in the polymer.

*Example 3.*—A reaction vessel capable of withstanding pressures up to 12,000 atm. is charged with a mixture of 1.56 parts of methanol, 0.23 part of ethylene, 1.22 parts of carbon monoxide, and 0.02 part of di-t-butyl peroxide and heated for 16.5 hrs. at 130° C. and a pressure of 8000 to 7500 atm. After cooling, the unreacted gas is measured after releasing through a trap maintained at −40° C.; 1.24 parts is recovered. This compares with 1.45 parts of ethylene and carbon monoxide charged. The product solution amounts to 1.70 parts or 0.22 part in excess of the liquids charged. The solution is clarified by centrifugation and the solvent evaporated at 0.5 mm., leaving 0.275 part of a solid polymer. This polymer is composited with those of four other runs made under the same conditions by dissolving the polymer in methanol, casting the solution on a plate, and drying to constant weight at reduced pressure.

The composite sample, which is obtained as a clear film, contains 51.8% carbon, 7.3% hydrogen and 23.1% methoxyl, and has a saponification equivalent of 128. On treatment with concentrated $H_2SO_4$ at 80° to 140° C. for 30 mins., 112 ml. of carbon monoxide is evolved per gram of polymer. In contrast, copolymers of ethylene and carbon monoxide which contain no combined methanol give less than 1.5 ml. of carbon monoxide/g. under similar treatment. The infrared spectrum of this polymer shows strong absorption bands at 2.9 mu, which is in the hydroxyl region, and at 5.7 mu in the carbonyl region. No such absorption at 2.9 mu is shown by polymers containing only ethylene and carbon monoxide.

*Example 4.*—A mixture of 1.52 parts of methanol, 0.68 part of ethylene, 0.81 part of carbon monoxide ($C_2H_4$/CO ratio=0.84) and 0.01 part of di-t-butyl peroxide is heated for 16.5 hours in a pressure reactor at 130° C. and a pressure of 8000 to 7300 atm. After cooling, the unreacted gas is bled through a trap at −40° C. and 1.02 parts, or 0.47 part less than the ethylene and carbon charged, are collected. Correspondingly, the polymer solution remaining is 0.47 part heavier than the methanol solution of catalyst charged. The contents of the reactor are taken up in methanol and the solution is clarified by centrifugation and cast on a smooth glass plate. After drying for 16 hours, the resulting clear film is vacuum-dried to constant weight at 70° to 90° C./0.5 mm. The final recovery of dry polymer is 0.585 part. The difference between this figure and the gas consumed, or 0.115 part, indicates that the polymer contains about 20% by weight of combined methanol. This compares with a methoxyl content of 21.2% as determined by the Zeisel method. The carbon and hydrogen contents of 59.8% and 7.2%, respectively, correspond to a composition containing by weight 47.3% carbon monoxide, 32.9% ethylene and 19.8% methanol.

*Example 5.*—A pressure vessel is charged with 0.76 part of methanol, 0.65 part of a 1.25/1 ethylene/carbon monoxide mixture, and 0.005 part of di-t-butyl peroxide and heated for 18 hours at 130° C. under a pressure of 8000 to 7500 atm. The pressure is let down to 1 atm. and the viscous solution washed out of the reaction vessel with methanol. This solution is filtered and the methanol removed by evaporation in a stream of nitrogen at 65° C., followed by vacuum-drying at 60° to 80° C./0.5 mm. The yield of polymer is 0.28 part. Its melting point, as determined under a polarizing microscope having a microheating stage, is 147° to 156° C., and it contains 56.0% carbon and 7.2% hydrogen. A film made by molding the polymer between two plates at 130° C. under a pressure of 2000 lbs./sq. in. is clear, tough and can be cold drawn.

Polymer obtained by compositing several runs made under the same conditions as described above has approximately the same elemental analysis, i. e., 56.3% carbon and 7.2% hydrogen. Its saponification equivalent is 172. This polymer dissolves readily at roughly 1% solids in the following hot solvents to give solutions stable at 25° C.: acetone, dioxane, dimethylformamide, pyridine, acetic acid, phenol, 85% aqueous phenol and chloroform. It is insoluble in boiling ether, benzene or xylene. It dissolves readily in 5% aqueous sodium hydroxide at 100° C., more slowly at 25° C. Films are obtained by casting from solution or by molding the bulk polymer under the influence of heat and pressure.

The product of a run made under the same conditions as above has similar composition (56.8% carbon and 7.5% hydrogen). Its intrinsic viscosity, determined in phenol containing 15% water, is 0.84.

*Example 6.*—A mixture of 79 parts of methanol and 0.5 part of di-t-butyl peroxide is charged into a silver-lined reaction tube, filling it to about one quarter of its capacity. A compressed mixture of ethylene and carbon monoxide containing 50% of each component is then admitted to the vessel which is agitated vigorously and heated for 19 hours at a temperature of 128° to 132° C. while the pressure is maintained at 830 to 1000 atm. The total pressure drop during this period is 200 atm. The vessel is cooled, the pressure released to atmospheric, and 11.3 parts of a yellowish polymer obtained by drying the crude product, first in air and finally in vacuo. Its elemental analysis of 61.94% and 7.65% hydrogen corresponds to a composition containing by weight 45.5% ethylene, 47.2% carbon monoxide, and 7.3% methanol. Its saponification equivalent is 286 and its methoxyl content is 8.02%. It dissolves readily in hot or cold chloroform. When heated under a polarizing microscope, the polymer begins to melt at 159.8° C. and is mostly molten at 177.4° C., the crystalline phase finally disappearing completely at 186.8° C.

*Example 7.*—A silver-lined reaction tube is filled to about one fourth of its capacity with a mixture of 39 parts of methanol and 0.5 part of di-t-butyl peroxide. A compressed gas mixture containing 70% ethylene and 30% carbon monoxide is admitted to the vessel, which is then agitated vigorously and heated for 2.25 hrs. at 129° to 130° C. and 1890 to 2000 atm. The gas consumed during this period causes a total pressure drop of 330 atm. The vessel is cooled, the pressure released, and 11.0 parts of polymer is recovered from the reaction mixture by air- and vacuum-drying. The polymer melts over the range 125° to 141° C., has an intrinsic viscosity as measured in chloroform solution of 0.55, and has carbon, hydrogen, and methoxyl contents of 63.41%, 7.94%, and 6.02%, respectively. A film obtained by pressing the polymer at 130° C. is clear, colorless and orientable. It has a tensile strength of 2900 lbs./sq. in. and an elongation at break of 42%.

*Example 8.*—A silver-lined reaction tube is filled to about one fourth of its capacity with a mixture of 39 parts of isopropyl alcohol and 2 parts of di-t-butyl peroxide. A compressed gas mixture containing 21% ethylene and 79% carbon monoxide is then admitted to the vessel, which is agitated vigorously and heated for 2.75 hrs. at a temperature of 129° to 131° C. and a pressure of 2900 to 3000 atm. The total pressure drop is 190 atm. The vessel is cooled, the pressure released, and 7.0 parts of polymer obtained by air- and vacuum-drying of the product mixture. The polymer is soluble in chloroform or dioxane. It has a saponification equivalent of 204 and an intrinsic viscosity of 0.18 as measured on a 0.1% solution in chloroform. Carbon and hydrogen contents of 60.98% and 8.55%, respectively, indicate that it contains by weight 29.3% ethylene, 38.1% carbon monoxide and 32.6% isopropyl alcohol.

*Example 9.*—A pressure reactor is charged with 1.53 parts of absolute ethyl alcohol, 0.57 part of ethylene, 0.94 part of carbon monoxide and 0.01 part of di-t-butyl peroxide and heated for 16.5 hours at 130° C. and 8000 to 7300 atm. pressure. After cooling and dropping the pressure to atmospheric, there remains 1.79 parts of a viscous solution, indicating that 0.26 part of the ethylene/carbon monoxide gas mixture has reacted. Additional ethanol is added to give a less viscous solution, which is centrifuged to remove solid particles and then cast on a smooth flat surface. After evaporation of most of the solvent alcohol, 0.378 part of a clear, stiff film is obtained. After further drying to constant weight at 65°/0.5 mm., the final recovery of polymer is 0.364 part or about 0.10 part in excess of the ethylene and carbon monoxide consumed. It contains 57.8% carbon, 7.6% hydrogen and 25.2% ethoxyl.

*Example 10.*—A pressure reactor is charged with 0.75 part of isopropyl alcohol, 0.55 part of a gas mixture consisting of ethylene and carbon monoxide in the ratio 1.24/1, and 0.0043 part of 1,1'-diazocyclohexanecarbonitrile, and is then heated for 18 hours at 100° C. and 8000 to 7300 atm. The product is a viscous solution from which 0.13 part of polymer is recovered after removal of the unreacted alcohol by evaporation at 80° to 90° C./0.5 mm. Carbon and hydrogen contents of 60.1% and 8.0%, respectively, correspond to an estimated composition containing by weight 41.7% carbon monoxide, 30.2% ethylene and 28% isopropyl alcohol.

*Example 11.*—A mixture of 1.52 parts of t-butyl alcohol, 0.62 part of ethylene, 0.87 part of carbon monoxide, and 0.01 part of di-t-butyl peroxide is heated in a pressure reactor for 16.7 hrs. at 130° C. and 8000 to 7600 atm. pressure. After cooling and releasing the pressure, the contents of the reactor are washed out with a t-butyl alcohol. The solution thus obtained is clarified by centrifugation and evaporated on a glass plate to give a clear film. After drying to constant weight at 56° to 65° C./0.5 mm. there is obtained 0.30 part of polymer. It is soluble in methanol and t-butyl alcohol, contains 60.4% carbon and 8.3% hydrogen, and has a saponification equivalent of 340. The elemental analysis corresponds to a composition containing 40.0% carbon monoxide, 21.1% ethylene and 38.9% t-butyl alcohol by weight. Polymers made in t-butyl alcohol have infrared spectra very similar to those made in methanol and show strong absorption bands at 2.9 and 5.7 mu.

*Example 12.*—A mixture of 2.06 parts of benzyl alcohol, 1.32 parts of mixture of ethylene and carbon monoxide in the ratio 1.42/1, and 0.016 part of di-t-butyl peroxide is charged into a pressure reactor and heated for 17 hours at 130° C. and a pressure of 8000 to 7500 atm. The crude product is a gel-like mass. Extraction of a part of this gel with ether to remove unconverted alcohol, followed by drying at 100° C./0.5 mm., gives a solid polymeric material containing 55.5% carbon and 6.5% hydrogen. Its infrared absorption spectrum is similar to those of polymers obtained under comparable conditions from mixtures of ethylene and carbon monoxide in methanol or t-butyl alcohol but shows the presence of benzyl as well as of hydroxyl and carbonyl groups.

*Example 13.*—A mixture of 2.38 parts of 2-(p-chlorphenoxy)-ethanol, 1.30 parts of a 1.42/1 ethylene/carbon monoxide mixture and 0.01 part of di-t-butyl peroxide is heated for 17 hours at 130° C. and 8000 to 7500 atm. in a high pressure reactor. After drying the resulting gel-like mass to constant weight at 100°/0.5 mm., there is obtained 0.88 part of polymer containing 7.13% chlorine which corresponds to 34.6% by weight of 2-(p-chlorphenoxy)-ethanol.

*Example 14.*—A pressure reaction vessel is charged with 1.68 parts of allyl alcohol, 0.55 part of ethylene, 0.85 part of carbon monoxide and 0.01 part of $\alpha,\alpha'$-azodiisobutyronitrile and heated for 17 hours at 75° C. and 8000 to 7500 atm. The crude product, which is partially gelled, is treated with methanol and the insoluble portion separated. The methanol solution on evaporation and drying at 65° C./0.5 mm. yields 0.05 part of clear polymer which is readily soluble in cold 10% sodium hydroxide. It contains 56.2% carbon and 6.9% hydrogen and its infrared spectrum shows hydroxyl and carbonyl absorption bands.

*Example 15.*—A pressure vessel is charged with 50 parts of ethylene glycol, 0.70 part of di-t-butyl peroxide and 26 parts of ethylene. The pressure is then built up to 2500 atm. by adding carbon monoxide and the vessel heated for 1.5 hours at 130° C. After cooling and releasing the pressure, the polymer, which appears as a solid phase, is separated from the glycol, washed with methanol, and dissolved in dioxane. This solution is spread on a plate and after evaporation of the solvent, yields 1.9 parts of a somewhat rubbery polymer. In order to insure complete removal of unreacted glycol, the polymer is redissolved in dioxane and precipitated in water in a Waring Blendor to give a tan colored powder which is separated by filtration, washed with water and thoroughly dried in vacuo. The polymer recovered after this treatment amounts to 0.98 part. It contains 61.2% carbon and 7.4% hydrogen, and its infrared spectrum indicates the presence of hyroxyl and carbonyl groups. Its saponification equivalent is 229.

*Example 16.*—A mixture of 1.54 parts of methanol, 0.60 part of propylene, 0.49 part of carbon monoxide and 0.016 part of di-t-butyl peroxide is heated at 130° C. and 8000 to 7500 atm. for 16 hours in a high pressure reaction vessel. After removal of the unconverted reactants by the methods described in previous examples, there is obtained 0.30 part of white polymer. It is soluble in methanol, ethanol and chloroform, forms a stiff, clear film when pressed between plates at 130° to 145° C. and contains 58.6% carbon and 7.8% hydrogen. Calculations based on this elemental analysis indicate its composition to be by weight: carbon monoxide, 43.1%; propylene, 39.3%; methanol, 17.6%. Its methoxyl content as determined by the Ziesel method is 18.8%.

*Example 17.*—A mixture of 1.51 parts of methanol, 0.57 part of isobutylene, 1.09 parts of carbon monoxide and 0.016 part of di-t-butyl peroxide is heated in a pressure vessel for 16.5 hours at 130° C. at a pressure of 8000 to 7500 atm. The resulting polymer solution is filtered and the solvent removed at 80° C./0.5 mm., leaving 0.04 part of colorless brittle solid containing 61.1% carbon and 8.0% hydrogen.

*Example 18.*—A reaction vessel of the type used in Example 3 is charged with 0.77 part of 1-butene, 1.54 parts of methanol, 0.87 part of carbon monoxide and 0.016 part of di-t-butyl peroxide and then heated for 16.6 hours at 130° C. and 8000 to 7500 atm. After filtration of the resulting methanol solution of polymer, and removal of the free methanol at 85°/0.5 mm., there is obtained 0.08 part of colorless solid containing 60.9% carbon and 8.1% hydrogen. Its infrared absorption spectrum is similar to those of polymers of previous examples obtained from ethylene, carbon monoxide and methanol.

*Example 19.*—A pressure reactor of the type used in Example 3 is charged with 0.74 part of methanol, 0.26 part of butadiene, 0.44 part of carbon monoxide, and 0.005 part of di-t-butyl peroxide and heated for 17.5 hours at 130° C. and a pressure of 8000 to 7500 atm. After removal of unconverted methanol and butadiene by drying at 65° C./0.5 mm., there is obtained 0.165 part of white polymer containing 69.2% carbon, 8.3% hydrogen and 12.4% methoxyl.

*Example 20.*—A mixture of 1.51 parts of t-butyl alcohol, 0.59 part of 1-butene, 1.00 part of carbon monoxide and 0.04 part of di-t-butyl peroxide is heated for 17 hours at 130° C. and 8000 to 7400 atm. in a pressure reactor. After cooling and releasing the pressure, the crude solution is centrifuged and the clarified liquid spread on a plate to dry. After further drying at 65° C./0.5 mm. the recovered polymer amounts to 0.03 part. It contains 63.8% carbon, 9.1% hydrogen and 20.0% t-butoxyl.

*Example 21.*—A mixture of 1.81 parts of methyl formate, 0.67 part of ethylene, 0.88 part of carbon monoxide and 0.01 part of di-t-butyl peroxide is heated in a pressure reactor for 16.7 hours at 130° C. and 8000 to 7500 atm. After cooling and releasing pressure, the vessel is washed out with additional methyl formate and the solution is clarified by centrifugation and cast on a smooth plate. The clear film remaining after evaporation of most of the solvent, after additional drying for 24 hours at 56° C./0.5 mm., amounts to 0.11 part. It contains 58.1% carbon, 7.0% hydrogen, and 22.9% methoxyl. Its infrared spectrum is similar to those of polymers obtained from methanol, ethylene, and carbon monoxide.

*Example 22.*—A silver-lined pressure reactor is charged with 79.2 parts of methanol and 2 parts of di(tertiary-butyl)peroxide. The reactor is cooled, evacuated, and 10 parts of propylene is distilled thereinto, after which the reactor is pressured to 1000 atmospheres at 130° C. with a gas mixture composed of 60% ethylene and 40% carbon monoxide. The reactor is shaken and maintained at 130° C. and 840 to 1000 atmospheres pressure for 19 hours. Thereafter, the reactor is allowed to cool, is opened, and its contents are discharged. From the reaction mixture there is isolated 81 parts of a white solid containing 64.51% carbon, 8.05% hydrogen, and 5.61% methoxyl.

*Example 23.*—A silver-lined pressure reactor is charged with 85.5 parts of allyl alcohol and 2 parts of di(tertiary-butyl)peroxide. The reactor is cooled, evacuated, and pressured to 980 atmospheres at 145° C. with a gas mixture composed of 60% ethylene and 40% carbon monoxide. The reactor is shaken and maintained at 145° C. and 890 to 980 atmospheres pressure for 2 hours. The reactor is then allowed to cool, the contents discharged, and the reaction mixture is distilled with two additions of 52 parts each of dioxane, distilling out ca. 52 parts of dioxane between each addition. There is thus obtained 35.4 parts of a yellow solution, containing approximately 67% solids. A film cast from this solution on Bonderized steel, baked 30 minutes at 150° C., is clear, light yellow in color, tough and insoluble in the common organic solvents.

*Example 24.*—A silver-lined pressure reactor is charged with 0.1 part of di(tertiary-butyl) peroxide and 50 parts of methanol. The reactor is cooled, evacuated and placed on a shaking rack equipped with heating means, and heat is applied. As the temperature is raised, there is injected into the reactor a gas mixture consisting of 70% ethylene and 30% carbon monoxide. The temperature is held at 129° to 132° C. and the pressure at 2400 to 2500 atmospheres for 3.25 hours. The reactor is allowed to cool, pressure is released by venting the gases, and the reactor is then opened. The product obtained is a white solid weighing 6.5 parts. Analysis of this product shows it to contain 62.75% carbon, 7.83% hydrogen, and 9.28% methoxyl groups. This product is readily soluble in boiling chloroform and boiling dioxane and sparingly soluble in cold chloroform. The inherent viscosity of a chloroform solution of this product is 0.93. Films thereof, prepared either by hot pressing or by casting from solution, are transparent and strong; they can be cold-drawn.

*Example 25.*—A mixture of 7.4% ethylene and 28.6% CO was prepared by charging a 2500 cc. pressure vessel to 1970 lbs./sq. in. with CO and finally pressuring to 900 atm. with ethylene. This monomer mixture was displaced at a rate of 350 parts per hour by water metered from a high pressure piston pump. A second stream comprising 0.44% of ditert.-butyl peroxide in methyl alcohol was pumped directly with a high pressure metering pump. These streams were combined in a mixing block and directed through a reactor coil comprising 55 ft. of 1/4" x 1/8" stainless steel tubing maintained at 175° C. by means of automatically controlled electrical heaters. The flow rates were calculated to maintain a contact time of 4.0 minutes wtih a feed comprising 69.1% methanol, 30.6% mixed gas and 0.3% catalyst, and the pressure was maintained at 900 atm. by manual control of the terminal bleed-down valve. The product expanded from this terminal control valve was a milky suspension of polymer in the methanol medium. The polymeric product which was filtered from the reaction mixture amounted to 69 parts for each hour's operation or 19.7% conversion based on the monomer input. On the basis of carbon-hydrogen analysis and a Ziesel methoxyl determination the methanol insoluble product contained 59.1% ethylene, 38% CO and 2.9% methyl alcohol. The average molecular weight was 2900. By evaporation of the methyl alcohol filtrate, a second product was isolated in amounts corresponding to 23 parts for each hour's operation or 6.6% conversion based on monomer input. This material was a soft grease containing 62.18% ethylene, 33% CO and 4.82% methyl alcohol. The average molecular weight was 1050.

*Example 26.*—Using the same general operating technique described in the preceding Example 25 a gas mixture containing 90% ethylene and 10% CO was prepared by pressuring the reservoir cylinder to 620 lb./sq. in. with CO and finally injecting ethylene to a total pressure of 600 atm. This monomer mixture was displaced at a metered rate of 350 parts per hour and blended with a medium stream comprising 0.44% ditert.-butyl diperphthalate in methanol pumped at a rate of 792 parts per hour. These rates permitted a contact time of 3.5 minutes with a reaction medium comprising 69.1% methanol, 30.6% monomers and 0.3% catalyst and the reaction mixture was maintained at 600 atms. and 150° C. The liquid product discharged from the unit was a suspension of a white solid in the methanol medium. The methanol insoluble product, which was separated by filtration, was obtained at an average rate of 29 parts for each hour's operation corresponding to an average conversion of 7.6%. This material contained 65.5% ethylene, 33.6% CO and 0.85% methanol. The average molecular weight was 2370. By evaporation of the alcohol filtrate a soft semisolid product was obtained at an average rate of 7.5 parts for each hour's operation. This material was comprised of 57.7% ethylene, 41.4% CO and 0.88% methanol and the average molecular weight was 720.

*Example 27.*—A 60/40 ratio mixture of ethylene and carbon monoxide was prepared by pressuring the reservoir cylinder to 193 atm. with CO and then to a total pressure of 900 atm. with ethylene. This stream was displaced by water at a rate of 750 parts per hour and combined with a medium stream comprising 5.4% ditert.-butyl peroxide in methanol, metered at a rate of 250 parts per hour. These rates were calculated to maintain a feed comprising 25% methanol, 75% monomers and 0.6% catalyst with a contact time of 5.6 minutes at 900 atm. and 175° C. The methanol insoluble product was obtained as a fine white powder at an average rate of 16 parts for each hour's operation corresponding to 2.1% conversion based on total monomer input. This material contained 56.8% ethylene, 40.5% CO and 2.65% methanol. The average molecular weight was 3765. A very small proportion of methanol soluble material amounting to 4 parts per hour or 0.5% conversion was obtained by evaporation of the methanol filtrate.

*Example 28.*—A 75/25 ratio mixture of ethylene and carbon monoxide was prepared by pressuring the reservoir cylinder to 1540 lbs./sq. in. with CO and injecting ethylene to a total pressure of 600 atm. This gas mixture was displaced at a rate of 211.2 parts per hour and combined with a separate stream of isobutylene which was displaced from a reservoir cylinder by means of water at a rate of 52.8 parts per hour. The combined monomers were mixed with a medium stream of 1.33% ditert.-butyl peroxide in methanol pumped directly at a rate of 792 parts per hour. The combined streams gave a reaction medium comprising 74% methanol, 5% isobutylene, 15.0% ethylene, 0.5% CO and 1% ditert.-butyl peroxide which was pumped through the reactor at 220° C., 600 atm. pressure, and contact time of 3.5 minutes. The product discharged from the terminal control valve was an amber-colored solution of polymer in methyl alcohol. By separation of the alcohol solvent in a stripping still under reduced pressure, a soft vaseline-like polymer was isolated in amounts corresponding to 67 parts for each hour's operation or a conversion of 25.4% based on total monomer input. The material contained 20.4% CO, 1.71% methanol and 77.81% olefin components. The infrared analysis indicated that the olefin portion was made up of equimolar proportions of ethylene and isobutylene.

*Example 29.*—In a duplication of the operation described in the preceding Example 28, propylene was employed in place of isobutylene and the run was carried out at a temperature of 200° C. and 600 atms. pressure. The liquid products discharged from the unit were amber-colored solutions of the polymer in methanol. The soft greaselike product remaining after distillation of the methanol medium was comprised of 22.8% CO, 3.68% methanol and 73.52% olefins. The olefin component was found to be equal mole ratios of propylene and ethylene by infrared analysis. The average molecular weight of these products was 780. This product was produced at an average rate of 85 parts per hour of operation or 32.4% conversion based on total olefin input.

*Example 30.*—A pressure reactor is charged with 600 parts of isopropyl alcohol, 6 parts of di-t-butyl peroxide, and pressured with a 1:1 ethylene/carbon monoxide gas mixture; the mixture is heated under 500 lb./sq. in. pressure at 135° C. for several hours. There is obtained 5 parts of t-amyl alcohol; its 3,5-dinitrobenzoate melts at 114° to 114.5° C. alone or when mixed with an authentic sample (prepared according to the method of Wild, "Characterization of Organic Compounds," Cambridge University Press, 1947, p. 53); there is also obtained 2.5 parts of 2-methyl-2-hexanol which distills at 43° to 46° C. (9 mm.), $n_D^{25}$ 1.4196.

*Analysis.*—Calcd. for $C_7H_{16}O$: C, 72.4; H, 13.7; M. W. 116. Found: C, 72.48; H, 13.64; M. W. 133.

Its 3,5-dinitrobenzoate melts at 58° to 59° C.

*Analysis.*—Calcd. for $C_{14}H_{18}N_2O_6$: C, 54.2; H, 5.84; N, 9.05. Found: C, 54.35; H, 5.80; N, 9.50, 9.41.

There is also isolated in a yield of 3.3 parts a compound which includes a methyl group arising from the catalyst as well as ethylene, carbon monoxide, and isopropyl alcohol fragments, 1,1-dimethyl-2-ketononanol, B. P. 52° to 55° C. (1.5 mm.).

*Analysis.*—Calcd. for $C_{11}H_{22}O_2$: C, 71.1; H, 11.8; M. W. 186. Found: C, 70.99, 71.08; H, 11.83, 11.76; M. W. 177, 189.

The alcohol group is indicated by the red color imparted to acidified ceric nitrate solution, and the rapid formation of a hazy solution with zinc chloride-hydrochloric acid reagent shows it to be a tertiary hydroxyl. A precipitate with periodic acid demonstrates the vicinal arrangement of the keto and hydroxyl groups. There is additionally obtained about 26 parts of a viscous residue. Similar compounds are obtained with such other alcohols as methylisobutylcarbinol.

The properties of the polymeric hydroxy keto esters provided by the process of this invention vary widely depending on the polymer components, the proportions in which they are used, the reaction temperature and pressure, and the nature and amount of catalyst employed. The products are useful in a wide variety of applications, including unsupported films, adhesives, safety glass interlayers, fibers, molded objects, plasticizers, protective coatings, etc. They may be compression or injection molded, melt extruded, or calendered. They may be applied to porous or nonporous substrata in solution or emulsion form by casting, brushing, spraying, dipping, etc. In many cases their utility in specific applications may be enhanced by blending them in solution or milling them with plasticizers, organic or inorganic fillers, pigments, chemical modifying agents, other organic polymers, etc.

Since the polymeric hydroxy keto esters of this invention generally contain ketone groups, they can be modified chemically by treatment with a wide variety of chemical agents which normally react with ketones. The ester groups in these polymers may be hydrolyzed or saponified. The resulting products can be cross-linked by reaction with suitable di- or poly-functional reactants. By reaction with formaldehyde or its derivatives the polymeric esters are converted to products which, when molded at elevated temperatures with or without fillers in the presence of hexamethylenetetramine or acidic catalysts such as phthalic or maleic anhydride or without a catalyst, form hard, insoluble, infusible products. Soluble products of the reaction of the polymeric hydroxy keto esters of this invention with formaldehyde or its derivatives are particularly useful as plywood adhesives, especially when used with an acidic catalyst such as phthalic or maleic anhydride. By reaction of the polymeric hydroxy keto esters of this invention with acrylonitrile there are obtained derivatives which contain nitrile groups and can be hydrolyzed to polyacids. By treatment under suitable conditions with basic materials, that is, materials whose aqueous solutions have a pH greater than 7, such as ammonia, amines, sodium hydroxide, potassium hydroxide, sodium carbonate, etc., the soluble polymeric hydroxy keto esters of this invention may be converted into insoluble products. Valuable thermosetting compositions are obtained when these polymeric hydroxy keto esters are compounded in the dry state with a solid diamine like metaphenylenediamine. Oximes are obtained by reaction of the polymeric hydroxy keto esters of this invention with hydroxylamine. Hydrogenation of the polymeric hydroxy keto esters of this invention over suitable catalysts such as copper chromite, ruthenium oxide, or reduced nickel chloride results in conversion of at least a portion of the ketone groups to alcoholic hydroxyl groups. When the soluble polymeric hydroxy keto esters of this invention are heated with about 1% or more by weight of an organic peroxide like benzoyl peroxide they become insoluble and, in many cases, stronger and more pliable. The temperature at which they become tacky is also raised by this treatment. Treatment of the polymers with a stronger oxidizing agent like hot 70% nitric acid results in oxidation to acids which may be viscous liquids, greasy solids, or hard waxes and may have molecular weights as high as 2000 or higher.

Various changes may be made in the specific methods and preferred embodiments of this invention without departing from the invention or sacrificing the advantages thereof.

I claim:

1. A process for preparing polymeric hydroxy keto esters which comprises heating together carbon monoxide, an alcohol, and at least one polymerizable organic compound containing the group,

in the presence of a catalyst which is effective for promoting the homopolymerization of ethylene to solid polymers, and in the absence of a Friedel-Crafts catalyst at a temperature between 25° and 350° C. under superatmospheric pressure.

2. A process for the preparation of polymeric hydroxy keto esters which comprises heating together carbon monoxide, an alcohol, and a monoolefin hydrocarbon containing from 2 to 6 carbon atoms, in the presence of a catalyst which is effective for promoting the homopolymerization of ethylene to solid polymers, and in the absence of a Friedel-Crafts catalyst at a temperature between 25° and 350° C. under superatmospheric pressure.

3. A process for the preparation of polymeric hydroxy keto esters which comprises heating together carbon monoxide, an alcohol, and ethylene in the presence of a peroxy compound catalyst, and in the absence of a Friedel-Crafts catalyst, at a temperature between 25° and 350° C. under superatmospheric pressure.

4. A process for the preparation of polymeric hydroxy keto esters which comprises heating together carbon monoxide, an hydroxyalkane, and ethylene in the presence of an organic peroxy compound catalyst, and in the absence of a Friedel-Crafts catalyst, at a temperature between 25° and 350° C., under a pressure of from 500 to 20,000 atmospheres, and thereafter separating the polymeric hydroxy keto ester formed from the resulting mixture.

5. A process according to claim 4 in which said peroxy compound is di-tert. butyl peroxide.

6. A linear polymeric hydroxy keto ester characterized in that it has a molecular weight in excess of 500, and contains as part of the polymer chain, the recurring group

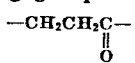

and the recurring group,

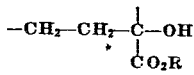

wherein R is an alkyl group having from 1 to 4 carbon atoms said polymeric hydroxy keto ester having been obtained in accordance with the process of claim 3.

7. A linear polymeric hydroxy keto ester, having a molecular weight of at least 500, formed from a substance of the class of alkanols and alkyl formates, and comonomers consisting of carbon monoxide and a polymerizable hydrocarbon containing ethylenic unsaturation, said hydrocarbon containing ethylenic unsaturation being one which undergoes addition polymerization across the C=C group when subjected to the polymerizing action of a peroxy compound, said polyhydroxy keto ester being characterized in that it has a polyketone structure, with recurring groups forming an integral

and

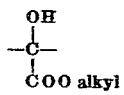

part of the polymer chain.

8. The composition set forth in claim 7 wherein the said substance of the class consisting of alkanols and alkyl formates is methanol, the alkyl radical in the

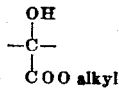

group being methyl.

9. The composition set forth in claim 7 wherein the said substance of the class consisting of alkanols and alkyl formates is methanol and the said polymerizable hydrocarbon is ethylene, the alkyl radical in the

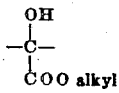

group being methyl.

10. A linear polymeric hydroxy keto ester, having a molecular weight of at least 500, formed from a substance of the class consisting of alkanols and alkyl formates and comonomers consisting of carbon monoxide and at least one polymerizable compound containing ethylenic unsaturation, said polymerizable compound being one which undergoes polymerization when subjected to the polymerizing action of a peroxy compound, said polyhydroxy keto ester being characterized in that it has a polyketone structure, with recurring

and

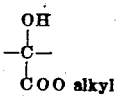

groups forming an integral part of the polymer chain.

11. A linear polymeric hydroxy keto ester, having a molecular weight of at least 500, formed from a substance of the class consisting of alkanols and alkyl formates and comonomers consisting of carbon monoxide, a polymerizable hydrocarbon containing ethylenic unsaturation, and at least one other polymerizable compound containing ethylenic unsaturation, said comonomers containing ethylenic unsaturation being compounds which undergo addition polymerization across the C=C group when subjected to the polymerizing action of a peroxy compound, said polyhydroxy keto ester being characterized in that it has a polyketone structure, with recurring

and

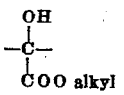

groups forming an integral part of the polymer chain.

12. The composition of claim 11 wherein the said hydrocarbon comonomer is ethylene.

MERLIN M. BRUBAKER.

REFERENCES CITED

The following references are of record in the file of this patent:

UNITED STATES PATENTS

| Number | Name | Date |
|---|---|---|
| 2,262,817 | Peck | Nov. 18, 1941 |
| 2,484,501 | Hagemeyer | Oct. 11, 1949 |

Certificate of Correction

Patent No. 2,557,256                                                June 19, 1951

MERLIN M. BRUBAKER

It is hereby certified that error appears in the printed specification of the above numbered patent requiring correction as follows:

Column 2, lines 47 and 48, for "vinylcoclohexene" read *vinylcyclohexene*; column 3, line 75, for "alpha,alpha-azobis" read *alpha,alpha'-azobis*; column 4, line 47, for the words "must used" read *must be used*; column 15, lines 61 to 73, for "with recurring groups forming an integral $-\overset{O}{\underset{}{C}}-$ and $-\overset{OH}{\underset{COO\ alkyl}{C}}-$ part of the polymer chain."

read

*with recurring* $-\overset{O}{\underset{}{C}}-$ *and* $-\overset{OH}{\underset{COO\ alkyl}{C}}-$ *groups forming an integral part of the polymer chain.*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*